W. G. KIRCHHOFF.
DOUGH MIXER.
APPLICATION FILED AUG. 29, 1912.

1,171,963.

Patented Feb. 15, 1916.
2 SHEETS—SHEET 1.

Witnesses;
J. Adolph Bishop.
C. S. Butler.

Inventor;
William G. Kirchhoff,
J. R. Cornwall.
Atty.

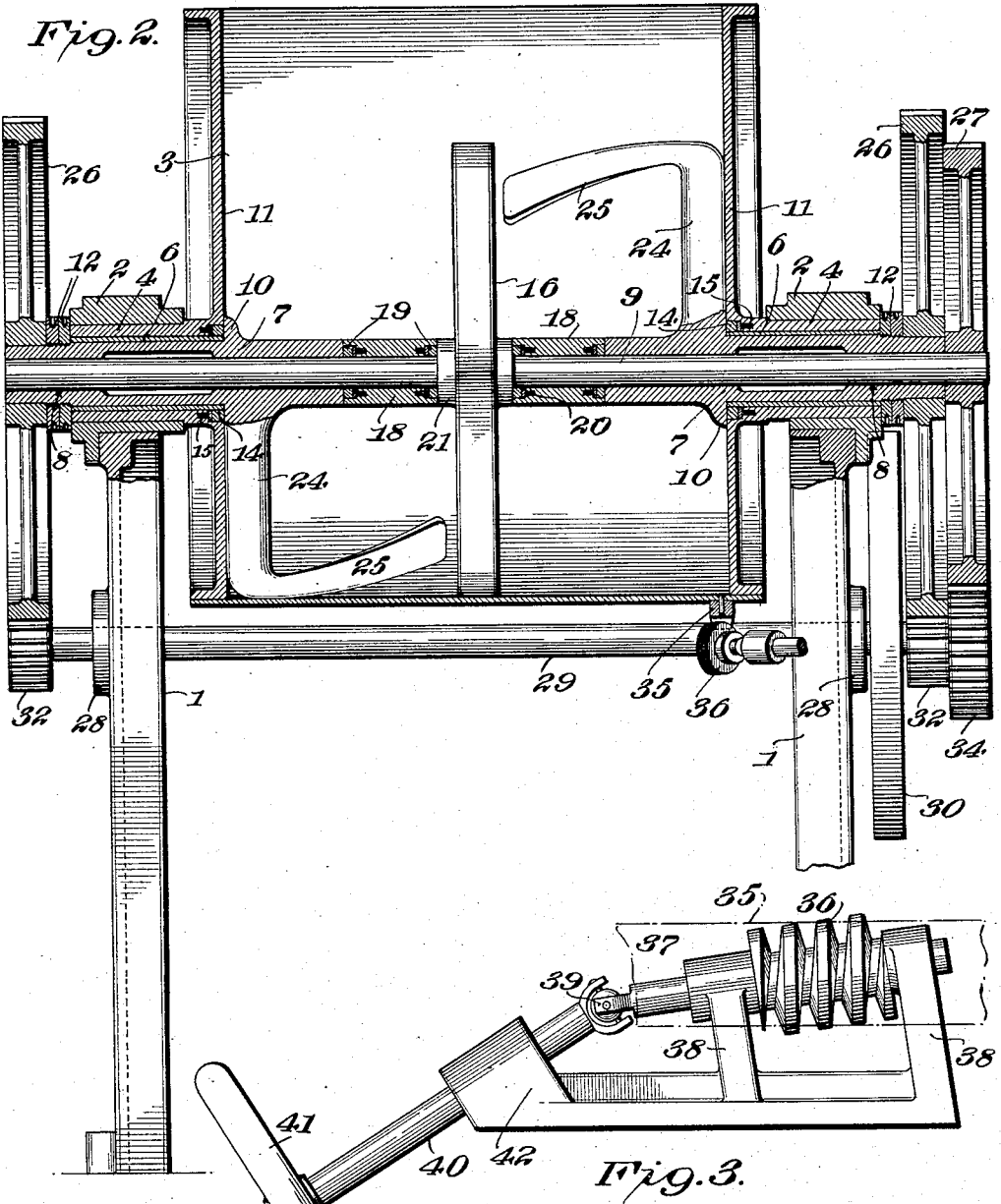

UNITED STATES PATENT OFFICE.

WILLIAM G. KIRCHHOFF, OF ST. LOUIS, MISSOURI, ASSIGNOR TO AMERICAN BAKERS MACHINERY COMPANY, OF ST. LOUIS, MISSOURI, A CORPORATION OF MISSOURI.

DOUGH-MIXER.

1,171,963.   Specification of Letters Patent.   Patented Feb. 15, 1916.

Application filed August 29, 1912. Serial No. 717,723.

*To all whom it may concern:*

Be it known that I, WILLIAM G. KIRCHHOFF, a citizen of the United States, residing at St. Louis, Missouri, have invented a certain new and useful Improvement in Dough-Mixers, of which the following is a full, clear, and exact description, such as will enable others skilled in the art to which it appertains to make and use the same, reference being had to the accompanying drawings, forming part of this specification, in which—

Figure 1:
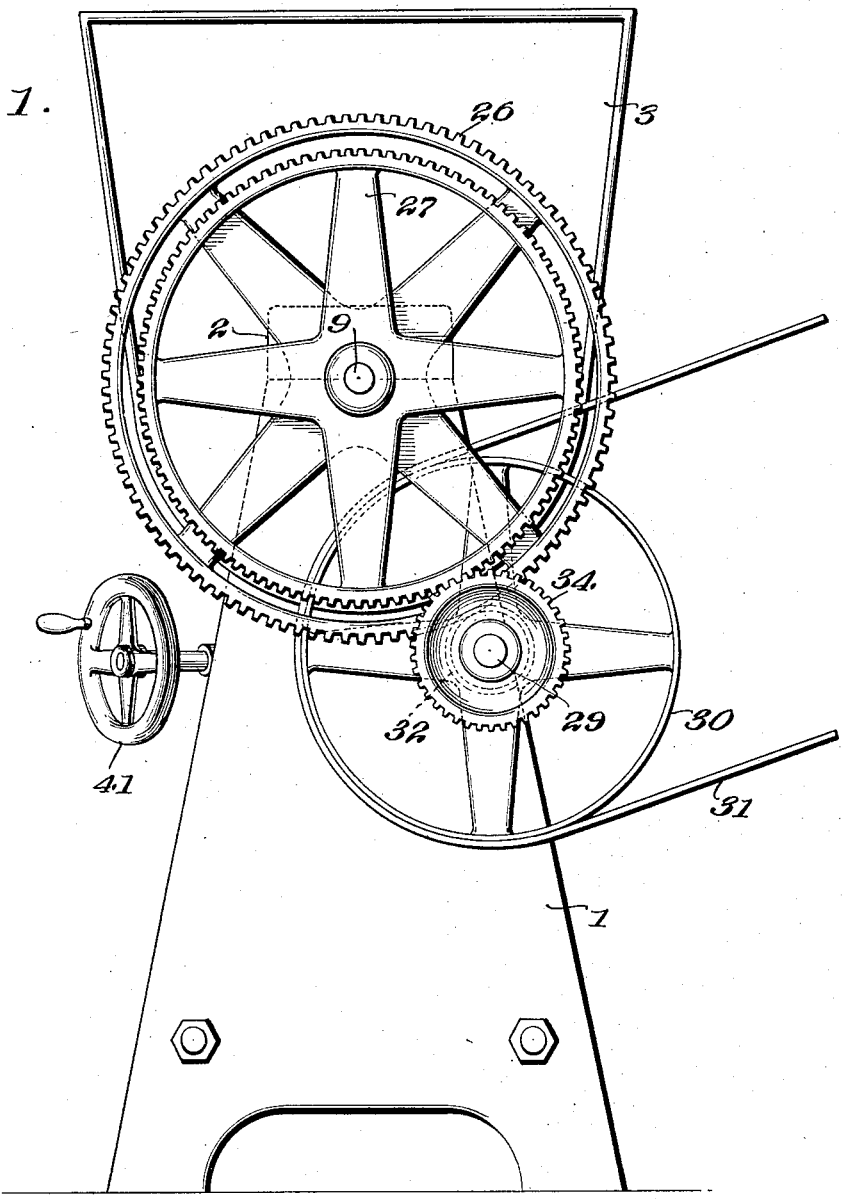
Figure 4:
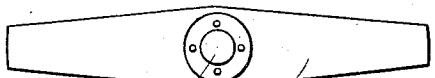

Figure 1 is an end view of my invention. Fig. 2 is a front view partially in section. Fig. 3 is a detail of the dumping mechanism. Fig. 4 is a side view of the beater arm.

My invention relates to a device for mixing dough.

The principal object of my invention is to provide a device of the class described, particularly adapted to thoroughly mixing the ingredients and to thoroughly develop by said operation all the gluten in the flour.

Another object of my invention is to provide in such a device mixing or kneading members which are adapted to pull or knead the dough without cutting it.

A further object of my invention is to produce such a device which may be operated with a minimum expenditure of power.

A still further object of my invention is to produce such a device adapted to thoroughly work small batches.

With these objects in view my invention consists in the combination and arrangement of parts hereinafter described and illustrated in the drawings in which like reference characters refer to like parts throughout.

My invention contemplates the use of a pair of similar end frames 1, in the upper portions of which are mounted a pair of journal members 2. A hopper 3 is provided with trunnions 4 which are journaled in said journal members 2 so as to support said hopper from the end frames 1. The bottom of the hopper 3 is curved on the arc of a circle described from the center of the trunnions 4 and the sides flare outwardly from said curved portion to the upper rim. The trunnions 4 are provided with inside bearing collars 6 in which are journaled a pair of sleeves 7. The arbors of said sleeves are provided with inner bearings 8 in which are journaled a shaft 9. The sleeves 7 are provided with collar portions 10 which bear against the inner faces of the end walls 11 of the hopper 3. Clamping rings 12 are threaded upon the arbors of the sleeves 7 and bear against the outer ends of journals 4 of the hopper. By screwing up rings 12, the trunnions 4 of the hopper 3 are clamped between said rings and collars 10. In the inner ends of the trunnions 4 are set packing rings 14 which are pressed against the collars 10 by small in-set springs 15. At the medial line of the hopper 3, there is mounted upon the shaft 9 a beater arm 16 extending radially of the shaft and of length such as just to clear the walls of the hopper. Between the beater arm 16 and the inner end of the sleeves 7 are interposed short quill sections 18 which are provided at their ends with packing rings 19 which are pressed by springs 20 against the hub 21 of the beater arm 16 and the ends of the sleeves 7. Upon the sleeves 7 are mounted arms 24 which carry at their outer extremities blades or flights 25 which are pitched so as to force material toward the shaft and to convey it toward the beater arm 16 when they are rotated. These blades sweep close to the curved wall of the hopper and extend from the arms 24 toward the orbit of the beater arm 16, a distance such that the beater arm 16 in its revolution will sweep adjacent their inner ends.

One edge of the arm 24 bears against the end 11 of the hopper and said arm is pitched backward from said forward edge so as to scrape material from the end of the hopper and carry it away therefrom. Upon the outer ends of the sleeves 7 are fixed large gear wheels 26 and upon one end of the shaft 9 is fixed a smaller gear wheel 27. Below the hopper 3 in the end frames 1 are journals 28 in which are mounted a driving shaft 29. The shaft 29 is driven from a pulley 30 actuated by a belt 31. The shaft 29 carries a pair of small driving pinions 32 which mesh with the gear wheels 26 and at one end a larger driving pinion 34 meshes with the smaller gear wheel 27. By this arrangement, it will be seen that the beater arm 16 carried on the shaft 9 will be more rapidly rotated through the gears 34 and 27 than will the sleeves 7 carrying the flights 25 through the gears 32 and 26.

Upon the curved casing of the hopper 3 is mounted an arcuate rack 35 with which meshes a worm screw 36 carried by stub shaft 37 mounted in brackets 38 on one of the end frames 1. The stub shaft 37 is connected by a universal joint 39 with the shaft 40 of a hand wheel 41 which is journaled in a bracket 42.

The arrangement of the parts just described is such that when the worm gear 36 is rotated by means of the hand wheel 41, the hopper 3 is rocked by virtue of the engagement of the rack 35 and the worm gear 36.

As thus constructed and assembled, it will be seen that the operation of my device is as follows: The hopper 3 being in its upright position, the ingredients for the mixture are placed therein. Through the transmission pulley 30, the driving shaft 29, through the gears 32 and 26, rotates the sleeves 7 carrying the blades 25, stirring the mixture and forcing it toward the shaft and the beater arm 16. The beater arm 16 operating between the blades 25 is rotated at a greater speed by the gearing 34—27 than are the blades. By the coöperation of the rapidly revolving beater arm 16 and the flights 25, the ingredients are thoroughly worked over and mixed, the dough being kneaded and pulled out between them but not cut or chopped up. When a batch has been properly mixed, it may be discharged from the hopper 3 by rotating the hand wheel 41 which tilts the hopper so that its inner side is readily accessible. The dough may then be dumped from the hopper readily as the beater arm 16, being substantially straight and free from any cross members or projections, has nothing to catch it and interfere with its removal.

I am aware that changes in the structure may be made in the device illustrated without departing from the scope of my invention.

I claim:

1. A device of the class described comprising a hopper, an arm revolubly mounted therein in position to coöperate with an end wall, a blade on the arm and projecting laterally therefrom and formed to coöperate with a wall of the hopper to convey material horizontally within the hopper, a beater arm revolubly mounted within said hopper and operating adjacent the extremity of said mixing blade, means for revolving said mixing blade within said hopper, and means for revolving said beater arm within said hopper in the same direction but at a greater speed, whereby dough may be engaged by said blade and said arm and pulled and drawn out in the kneading operation.

2. A machine of the class described comprising a hopper, a driving member extending thereinto, a pair of mixing blades revolubly mounted thereon and spaced apart therefrom and each coöperating with adjacent sides of the hopper to feed dough horizontally within said hopper, a beater arm revolubly mounted within said hopper intermediate the inner extremities of said mixing blades and adapted to coöperate therewith to knead and pull out dough, and means for revolving said blades and said beater arm in the same direction at different speeds.

In testimony whereof I hereunto affix my signature in the presence of two witnesses, this 14th day of August, 1912.

WILLIAM G. KIRCHHOFF.

Witnesses:
M. O. SMITH,
JESSIE CLARK.

Copies of this patent may be obtained for five cents each, by addressing the "Commissioner of Patents, Washington, D. C."